(No Model.)
J. D. ILER.
RECEPTACLE FOR AERATED LIQUIDS.
No. 473,006. Patented Apr. 19, 1892.
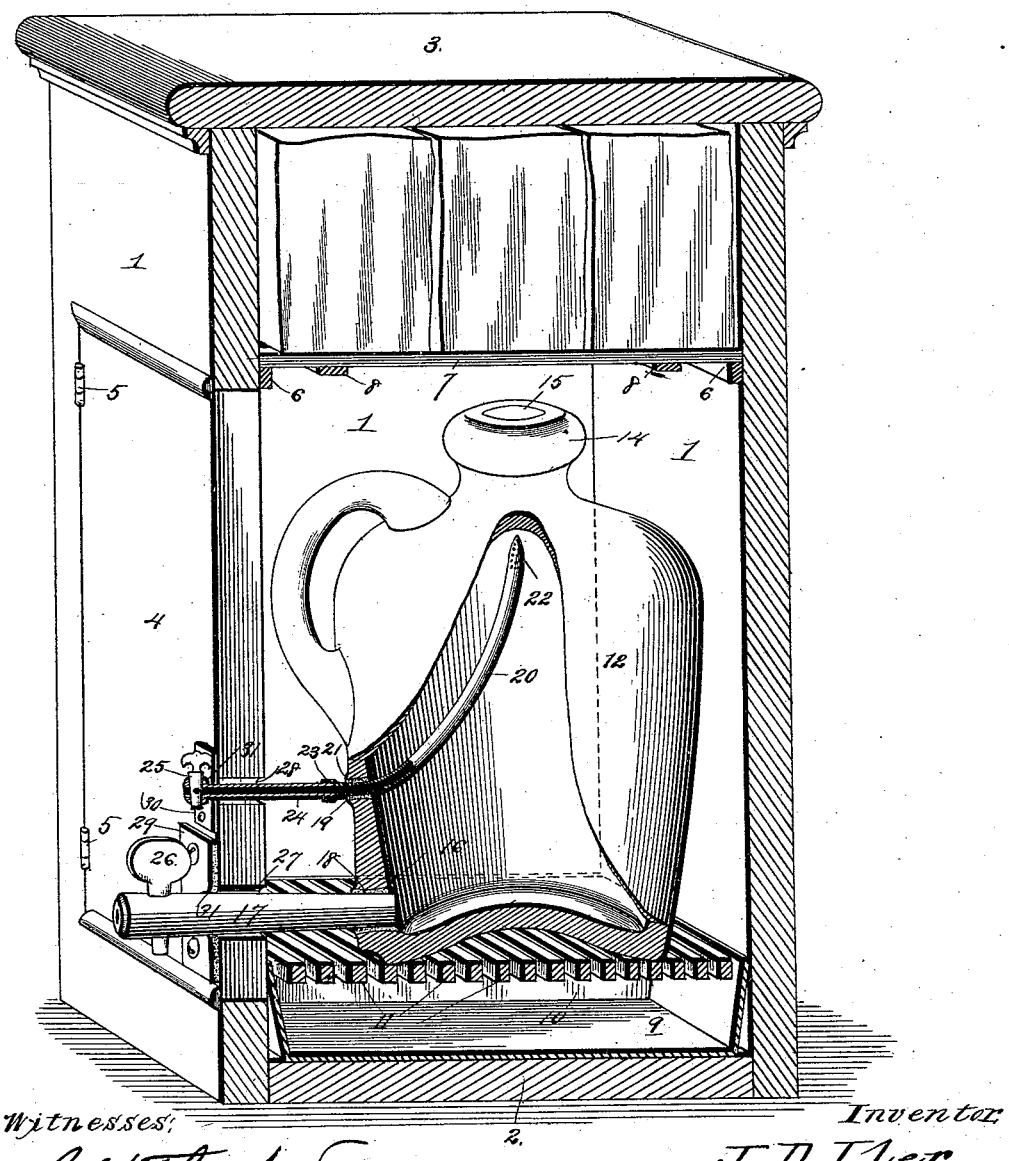
Witnesses:
Inventor:
J. D. Iler,
by Higdon & Higdon
Attorneys.

UNITED STATES PATENT OFFICE.

JOSEPH D. ILER, OF KANSAS CITY, MISSOURI.

RECEPTACLE FOR AERATED LIQUIDS.

SPECIFICATION forming part of Letters Patent No. 473,006, dated April 19, 1892.

Application filed October 22, 1891. Serial No. 409,546. (No model.)

*To all whom it may concern:*

Be it known that I, JOSEPH D. ILER, of Kansas City, Jackson county, Missouri, have invented certain new and useful Improvements in Receptacles for Aerated Liquids, &c., of which the following is a full, clear, and exact description, reference being had to the accompanying drawing, forming a part hereof.

My invention relates to receptacles for aerated liquids, such as beer, mineral waters, and similar liquids; and the objects of my invention are to produce a receptacle which shall be simple and inexpensive in construction, which shall prevent all loss of the gases from the liquids, so as to preserve them in lively condition, and which shall permit the liquid to be readily drawn or served from the receptacle, as required.

To the above purposes my invention consists in certain peculiar and novel features of construction and arrangement, as hereinafter described and claimed.

In order that my invention may be fully understood, I will proceed to describe it with reference to the accompanying drawing, in which the figure is a central transverse vertical section of a refrigerating-chamber, showing my improved receptacle placed therein.

In said drawing, 1 designates the sides, 2 the bottom, and 3 the top, of the refrigerating-chamber, said chamber being preferably of vertically elongated rectangular form and the said top being preferably removable from said chamber.

4 designates a door, which is hinged vertically, as at 5, to one side of the casing and which affords access to the interior of the latter.

In the upper part of the casing 1 are secured any suitable number of horizontal strips or beads 6, upon which rests a grating 7, composed, preferably, of parallel horizontal strips or slats secured together by cross-pieces 8. Upon the bottom of this casing is placed a drip-pan 9, above which is supported a grating 11, said grating being composed, preferably, of a number of parallel horizontal strips or slats supported upon cross-pieces 10, which rest upon the bottom of the pan.

12 designates my improved receptacle for the aerated liquids, the said receptacle being shown in the form of a jug, but being permissibly in the form of a demijohn or other similar article. The receptacle is shown as provided at one side with a handle 13 and at its top with a mouth 14, which is to be tightly closed by a suitable stopper 15. At one side, near its bottom, the receptacle 12 is provided with an opening 16, into which is inserted the inner end of a suitable spigot 17, a suitable bushing 18 being also inserted into the opening 16 and surrounding the spigot, so as to form a perfectly-tight joint.

19 designates a second opening, which is also formed in one side of the receptacle 12, preferably directly above the opening 16, and into this second opening is inserted a curved vent-tube 20, to be presently more fully described, a suitable bushing 21 being also inserted into said opening 19, so as to surround the vent-tube 20, and thus form a tight joint for the same. The vent-tube 20 is of substantially segmental form and when properly inserted into the opening 19 the upper end of the tube extends well upward beneath the stopper 15 in the mouth 14 of the receptacle 12; or, in other words, the upper end of the vent-tube extends above the usual level of the liquid in the receptacle. The upper end of this vent-tube is perforated, as at 22, for a purpose to be presently explained, and its lower or outer end is formed or provided with an internally-screw-threaded ring 23 to receive the externally-screw-threaded inner end of an extension-tube 24, the outer end of which is provided with a suitable cock or valve 25. It will thus be seen that when the cock or valve 25 of the vent-tube is closed no gas can escape from the receptacle. When the liquid has been partially drawn from the receptacle by opening the cock or valve 26 of the spigot 20, the cock or valve 25 of the vent-tube 20 is occasionally opened to admit air into the receptacle 12 for preserving air-pressure and is quickly closed so as to prevent any escape of gas. It will thus be seen that the liquid in the receptacle can be preserved at all times in prime condition and can be readily drawn from the same, as required.

The door 4 is provided at its free edge with two semicircular recesses 27 and 28, placed the one below the other and designed for the passage of the outer part of the spigot 17 and of the extension vent-pipe 24, respectively, as shown. In order to prevent any warm air from entering the refrigerating casing or chamber around the spigot and vent-pipe extension, rectangular guards or flaps 29 and 30 are screwed or otherwise secured to the outer surface of the door 4, adjacent to the recesses 27 and 28, the outer vertical margin of each of the guards or flaps having a semicircular recess 31, the margins of which closely surround the outer part of the vent-tube extension and the spigot. These flaps or guards are either used one for each opening, as shown, or in pairs, as preferred, and it will be seen that said guards or flaps entirely prevent the entrance of air around the vent and spigot.

It is to be observed that while I have described the receptacle as particularly designed for containing and delivering beer, mineral waters, and other aerated liquids, it is equally adapted to contain and deliver non-aerated liquids—such as whisky, buttermilk, &c. It is also to be observed that, owing to the complete separation of the vent-faucet from the delivery-faucet and to the relative locations of said parts, it is not necessary to open the vent-faucet each time that the delivery-faucet is opened, but only at such times as the necessary pneumatic pressure upon the liquid is lacking. Thus no gas is wasted and there is no danger of the liquid becoming rapidly stale or flat while being continuously drawn from the receptacle. From the above description it will be seen that I have produced a simple, compact, and inexpensive form of receptacle which is readily portable and which will preserve the liquids at all times in a fresh, lively, and palatable condition.

Having thus described my invention, what I claim as new therein, and desire to secure by Letters Patent, is—

A receptacle for aerated liquids, comprising a body portion or receptacle proper of substantially jug form, having an opening in its side near its bottom for receiving a delivery-spigot and also an opening in its side at a point above the delivery-spigot opening and designed to receive a vent-spigot, a bushing inserted into each of said openings, a delivery-spigot inserted into the lower opening, and a vent-spigot inserted into the upper opening, the said vent-spigot being separate from the delivery-spigot and having an upwardly-curved stem extending within the receptacle and perforated at its upper end and also extending at said end above the normal level of the liquid in the receptacle, substantially as set forth.

In testimony whereof I affix my signature in presence of two witnesses.

JOSEPH D. ILER.

Witnesses:
 JNO. L. CONDRON,
 H. E. PRICE.